(12) United States Patent
Liu et al.

(10) Patent No.: US 10,114,384 B2
(45) Date of Patent: Oct. 30, 2018

(54) FORMATION FLIGHT PATH COORDINATION OF UNMANNED AERIAL VEHICLES

(71) Applicant: Arrowonics Technologies Ltd., Richmond Hill (CA)

(72) Inventors: Hugh Hong-Tao Liu, Richmond Hill (CA); Hao Cheng Zhu, Toronto (CA); Everett James Findlay, Toronto (CA); Samuel Zhao, Oakville (CA)

(73) Assignee: Arrowonics Technologies Ltd., Richmond Hill (CA)

( * ) Notice: Subject to any disclaimer, the term of this patent is extended or adjusted under 35 U.S.C. 154(b) by 190 days.

(21) Appl. No.: 15/263,901

(22) Filed: Sep. 13, 2016

(65) Prior Publication Data

US 2018/0074520 A1 Mar. 15, 2018

(51) Int. Cl.
*G05D 1/00* (2006.01)
*G05D 1/10* (2006.01)
*B64C 39/02* (2006.01)
*G08G 5/04* (2006.01)

(52) U.S. Cl.
CPC ............ *G05D 1/104* (2013.01); *B64C 39/024* (2013.01); *G05D 1/0027* (2013.01); *G08G 5/045* (2013.01)

(58) Field of Classification Search
CPC combination set(s) only.
See application file for complete search history.

(56) References Cited

U.S. PATENT DOCUMENTS

| 6,889,941 | B1 * | 5/2005 | McElreath | B64C 39/024 244/135 A |
| 9,524,648 | B1 * | 12/2016 | Gopalakrishnan | B64C 39/00 |
| 9,798,329 | B2 * | 10/2017 | Shattil | G05D 1/104 |
| 9,836,047 | B2 * | 12/2017 | Clark | G05D 1/0011 |
| 9,848,459 | B2 * | 12/2017 | Darrow | H04W 84/18 |
| 9,857,791 | B2 * | 1/2018 | Krishnamoorthy | G05D 1/0011 |

(Continued)

*Primary Examiner* — Jonathan L Sample
(74) *Attorney, Agent, or Firm* — Grant Tisdall

(57) ABSTRACT

A method for implementation of a formation flight path coordination for a scalable group of Unmanned Arial Vehicles (UAVs) including a recursive architecture with a leader UAV and a plurality of follower UAVs in communication with the leader UAV, the method comprising the steps of: receiving formation commands for the UAVs of the group from a ground controller station (GCS), the formation commands including positional and velocity information for implementation by onboard processing systems, the formation commands received on a first communication channel established between the leader UAV and the GCS; sending information from the formation commands by the leader UAV to the plurality of follower UAVs belonging to the leader UAV using a second communication channel established between the plurality of follower UAVs and the leader UAV, the second communication channel separate from the first communication channel; receiving updated formation commands for the flight path from the GCS on the first communication channel; and sending information from the updated formation commands by the leader UAV to the plurality of follower UAVs using the second communication channel. Safety features such as collision avoidance and geofencing, as well as GCS configuration are also presented.

15 Claims, 4 Drawing Sheets

(56) References Cited

U.S. PATENT DOCUMENTS

| | | | |
|---|---|---|---|
| 9,894,158 B2* | 2/2018 | Ranasinghe | H04W 76/25 |
| 9,954,597 B2* | 4/2018 | Boss | H04B 7/18504 |
| 2004/0030449 A1* | 2/2004 | Solomon | B64C 39/024 |
| | | | 700/245 |
| 2004/0068416 A1* | 4/2004 | Solomon | F41H 13/00 |
| | | | 446/454 |
| 2015/0334768 A1* | 11/2015 | Ranasinghe | H04W 24/10 |
| | | | 370/328 |
| 2016/0025495 A1* | 1/2016 | Ashton | G01C 21/00 |
| | | | 701/3 |
| 2016/0028471 A1* | 1/2016 | Boss | H04W 84/06 |
| | | | 455/406 |
| 2016/0363929 A1* | 12/2016 | Clark | G05D 1/0011 |
| 2017/0069214 A1* | 3/2017 | Dupray | G08G 5/0021 |
| 2017/0083979 A1* | 3/2017 | Winn | G06Q 40/08 |
| 2017/0169713 A1* | 6/2017 | Gong | G08G 5/006 |
| 2017/0235316 A1* | 8/2017 | Shattil | G05D 1/104 |
| | | | 701/3 |
| 2017/0295609 A1* | 10/2017 | Darrow | H04W 84/18 |
| 2017/0344000 A1* | 11/2017 | Krishnamoorthy | G05D 1/0011 |
| 2018/0009549 A1* | 1/2018 | Sullivan | B64F 1/22 |

\* cited by examiner

FORMATION FLIGHT PATH COORDINATION OF UNMANNED AERIAL VEHICLES

FIELD

The present invention is related to control of unmanned aerial vehicles.

BACKGROUND

Unmanned aerial vehicles (UAVs) have been gaining popularity over a number of years due to the growth and advancement of unmanned technologies, as a variety of industries worldwide continue to adopt and adapt unmanned aircraft systems (UAS) for a variety of tasks. The role of UAVs continues to expand, as new technologies continue to enhance the capabilities of unmanned vehicle, system, and payload electronics. The focus of UAV development and implementation the world over, especially in times of economic pressure, is on operational efficiency and safety.

Advanced UAV sensor payloads are acquiring a wealth of data, including full-motion video (FMV) and high-definition (HD) images. Bandwidth is often limited, however, and can prevent the transmission, sharing, and implementation of mission-critical information. Such network limitations are driving the need for efficient data processing directly on the UAV. As such, operational efficiency and safety needs have focused UAV development on the ability to do as much autonomous onboard processing as possible and to reduce the volume of data exchanged between the UAV and ground stations.

With the ever-increasing demand for efficiency and flexibility, many engineering intensive applications opt to use multi-composed systems to conduct cooperative tasks. Such applications are widely spread across industry sectors, e.g., the multi-robot systems in automotive industry, the multi-actuated platforms in manufacturing, and formation flying of multiple flight vehicles or spacecraft (satellites) in aerospace, etc. The cooperative behavior for these multiple dynamic systems provides flexibility and maneuverability that cannot be achieved by an individual system. One key element to the success of such coordination is the motion synchronization among these involved components or systems. Motion synchronization addresses the cooperative or coordinated schemes of multi-composed systems when they work in an integrated fashion and are required to show the same kind of dynamic behavior. It requires high accuracy regulation of motion states such as the position, velocity and orientation. Therefore, the challenge lies in providing synchronized control strategy and real-time communications among the multi-composed systems.

With respect to flying vehicles, U.S. Pat. No. 6,271,768 to Frazier, Jr. et al. describes a system for avoiding traffic collisions, involving the cooperation of a follower aircraft in conjunction with lead aircraft. Data between the aircrafts are shared to coordinate flight. Similarly, U.S. Pat. No. 6,718,236 issued to Hammer et al. teaches a method of trajectory planning and prediction among vehicles in their coordinated maneuver. The approach involves receiving and using the state data of numerous vehicles to coordinate them within a common maneuver. In this aspect, the approach is focused on predicting the trajectory states of the vehicles to conduct the coordinated maneuvers. However, current state of the art has disadvantages in maintaining maneuvers, especially under disturbance or otherwise dynamically changing conditions of a flight path for a UAV group formation.

In addition, existing methods have not addressed the scalability of the system to allow for large formation flight or motion synchronization of multiple UAVs.

BRIEF DESCRIPTION OF THE DRAWINGS

Exemplary embodiments of the invention will now be described in conjunction with the following drawings, by way of example only, in which.

SUMMARY

Figure 1:
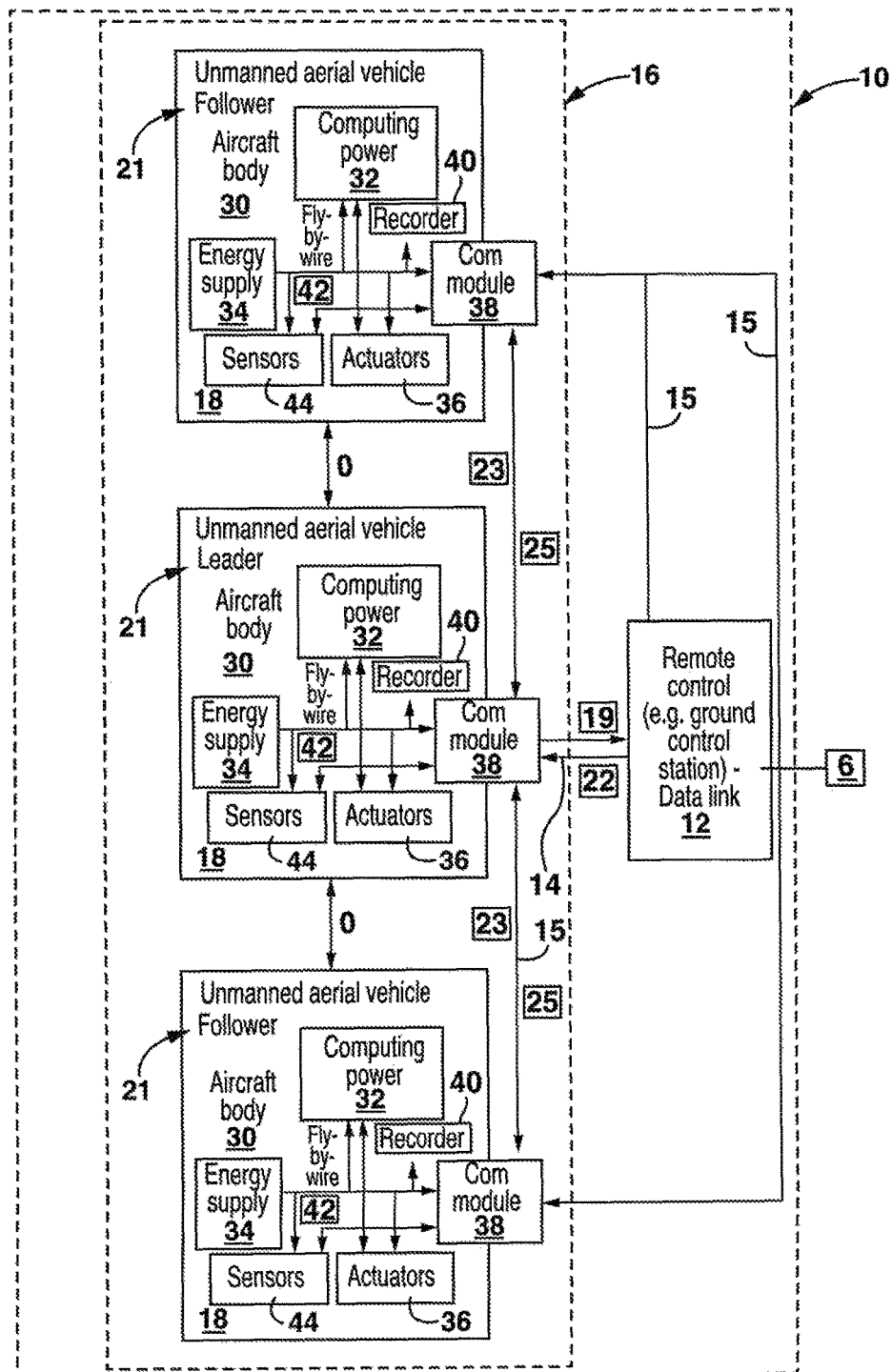
FIG. 1 is a block diagram of components of an unmanned aerial vehicle (UAV) control system.

It is an object of the present invention to provide a system and method UAV synchronization to obviate or mitigate at least some of the above presented disadvantages.

Another object of the present invention is to provide a system and method of scalable UAV synchronization to provide multiple UAV formation flight to obviate or mitigate at least some of the above presented disadvantages.

Motion synchronization addresses the cooperative or coordinated schemes of multi-composed systems when they work in an integrated fashion and are required to show the same kind of dynamic behavior. It requires high accuracy regulation of motion states such as the position, velocity and orientation. Therefore, the challenge lies in providing synchronized control strategy and real-time communications among the multi-composed systems. However, current state of the art has disadvantages in maintaining maneuvers, especially under disturbance or otherwise dynamically changing conditions of a flight path for a UAV formation.

One aspect provided is a method for implementation for a group of Unmanned Arial Vehicles (UAVs) in formation, including a leader UAV and a plurality of follower UAVs in communication with the leader UAV, the method comprising the steps of: receiving formation commands for the UAVs of the group from a ground controller station (GCS), the formation commands including positional and velocity information for implementation by onboard processing systems, the formation commands received on a first communication channel established between the leader UAV and the GCS; sending information from the formation commands by the leader UAV to the plurality of follower UAVs belonging to the leader UAV using a second communication channel established between the plurality of follower UAVs and the leader UAV, the second communication channel separate from the first communication channel; receiving updated formation commands for the flight path from the GCS on the first communication channel; and sending information from the updated formation commands by the leader UAV to the plurality of follower UAVs using the second communication channel.

Another aspect provided is a UAV configured for implementation of a formation flight path in a group of Unmanned Arial Vehicles (UAVs) including the UAV as a follower UAV of a plurality of follower UAVs in communication with a leader UAV, the UAV having a processor and memory for implementing a set of stored instructions for: receiving formation commands for the UAV from the leader UAV based on formation commands of a ground controller station (GCS), the formation commands including positional and velocity information for implementation by onboard processing systems, the formation commands received on a second communication channel established between the leader UAV and the UAV; receiving information from the formation commands from the leader UAV the second communication channel established between the plurality of follower UAVs and the leader UAV, the second communication channel separate from a first communication channel between the leader UAV and the GCS; receiving updated formation commands for the flight path from the leader UAV on the second communication channel from the leader UAV based on updated formation commands received by the leader UAV from the GCS.

Another aspect provided is a UAV configured for implementation of a flight path in a group of Unmanned Arial Vehicles (UAVs) including the UAV as a leader UAV and a plurality of follower UAVs in communication with the leader UAV, the UAV having a processor and memory for implementing a set of stored instructions for: receiving formation commands for the UAVs of the group from a ground controller station (GCS), the formation commands including positional and velocity information for implementation by onboard processing systems, the formation commands received on a first communication channel established between the leader UAV and the GCS; sending information from the formation commands by the leader UAV to the plurality of follower UAVs belonging to the leader UAV using a second communication channel established between the plurality of follower UAVs and the leader UAV, the second communication channel separate from the first communication channel; receiving updated formation commands for the flight path from the GCS on the first communication channel; and sending information from the updated formation commands by the leader UAV to the plurality of follower UAVs using the second communication channel.

Another aspect provided is a ground control station (GCS) for implementation of a flight path for a group of Unmanned Arial Vehicles (UAVs) including a leader UAV and a plurality of follower UAVs in communication with the leader UAV, the GCS comprising: a design interface for generating formation control script for use in sending to the leader UAV as a set of formation commands including positional and velocity information for implementation by onboard processing systems, the formation commands for receipt on a first communication channel established between the leader UAV and the GCS; and a processor and memory for implementing stored instructions of: sending the formation commands to the leader UAV for subsequent use by the plurality of follower UAVs belonging to the leader UAV; generating updated formation commands for the flight path from and sending on the first communication channel; wherein the information from the updated formation commands are for implementation by the leader UAV with the plurality of follower UAVs using a second communication channel separate from the first communication channel.

Another aspect provided is method for implementation of a flight path for a group of Unmanned Arial Vehicles (UAVs) including a leader UAV and a plurality of follower UAVs in communication with the leader UAV, the method for implementation by a computer processor using instructions stored on a storage of a ground control, station (GCS) for: generating formation control script for use in sending to the leader UAV as a set of formation commands including positional and velocity information for implementation by onboard processing systems, the formation commands for receipt on a first communication channel established between the leader UAV and the GCS; sending the formation commands to the leader UAV for subsequent use by the plurality of follower UAVs belonging to the leader UAV; generating updated formation commands for the flight path from and sending on the first communication channel; wherein the information from the updated formation commands are for implementation by the leader UAV with the plurality of follower UAVs using a second communication channel separate from the first communication channel.

Another aspect provided is a method for implementation of collision avoidance for a group of Unmanned Arial Vehicles (UAVs) including a leader UAV and a plurality of follower UAVs in communication with the leader UAV, the method comprising the steps of: receiving formation commands for the UAVs of the group from a ground controller station (GCS), the formation commands including positional and velocity information for implementation by onboard processing systems; sending information from the formation commands by the leader UAV to the plurality of follower UAVs belonging to the leader UAV; determining a relative distance between the leader UAV and an adjacent follower UAV of the plurality of follower UAVs is less than a predefined repulsion field threshold; calculating repulsion force vector based on the relative distance; and combining the repulsion force vector with a current velocity vector of the leader UAV using an onboard processing system of the leader UAV; and wherein the adjacent follower UAV implements a corresponding repulsion force vector with its current velocity vector using an onboard processing system of the follower UAV.

Another aspect provided is a UAV configured for implementation of collision avoidance in a group of Unmanned Anal Vehicles (UAVs) including the UAV as a follower UAV of a plurality of follower UAVs in communication with a leader UAV, the UAV having a processor and memory for implementing a set of stored instructions to: receive formation commands for the UAV from the leader UAV based on formation commands of a ground controller station (GCS), the formation commands including positional and velocity information for implementation by onboard processing systems; determine a relative distance between the UAV and an adjacent leader or follower UAV of the plurality of follower UAVs is less than a predefined repulsion field threshold; calculating repulsion force vector based on the relative distance; and combining the repulsion force vector with a current velocity vector of the UAV using an onboard processing system of the UAV; and wherein the adjacent leader or follower UAV implements a corresponding repulsion force vector with its current velocity vector using an onboard processing system of the adjacent leader or follower UAV.

Another aspect provided is a UAV configured for implementation of a collision avoidance in a group of Unmanned Arial Vehicles (UAVs) including the UAV as a leader UAV and a plurality of follower UAVs in communication with the leader UAV, the UAV having a processor and memory for implementing a set of stored instructions for: receiving formation commands for the UAVs of the group from a ground controller station (GCS), the formation commands including positional and velocity information for implementation by onboard processing systems; sending information from the formation commands by the leader UAV to the plurality of follower UAVs belonging to the leader UAV; determining a relative distance between the leader UAV and an adjacent follower UAV of the plurality of follower UAVs is less than a predefined repulsion field threshold; calculating repulsion force vector based on the relative distance; and combining the repulsion force vector with a current velocity vector of the leader UAV using an onboard processing system of the leader UAV; and wherein the adjacent follower UAV implements a corresponding repulsion force vector with its current velocity vector using an onboard processing system of the follower UAV.

DETAILED DESCRIPTION

Referring to FIG. 1, shown is an Unmanned Arial Vehicle (UAV) hierarchical network system control environment 10 having a ground control station (GCS) 12 communicating with a group 16 of UAVs 18 using a first communication channel 14. The group 16 of UAVs 18 is made up of a leader UAV 20 using the first communication channel 14 to communicate with the GCS 12 and a second communication channel 15 to communicate with a plurality of follower UAVs 21, as further described below. It is also recognised that the follower UAVs 21 communicate with one another using the second communication channel 15, as further described below. It is recognised that, as an embodiment, the overall hierarchical network 10 can be from the GCS 12 to command a group of leader UAVs 18, such that each leader UAV 18 commands its own group 16 of follower UAVs 21.

In the environment of the GCS 12 in communication with one of the leader UAVs 18, the GCS 12 transmits a formation command 22 to the leader UAV 20 using the first communication channel 14 and the leader UAV 20 communicates one or more respective waypoints (WP) of the formation command 22 to each respective follower UAV 21 (within the leader UAVs 18 group 16) using the second communication channel 15. Accordingly, the GCS 12 is responsible for communicating with the leader UAV 20 to provide an appropriate formation of the group 16 and the leader UAV 20 is responsible for communicating the WP information 23 to each of the follower UAVs 21 in order to enforce the appropriate formation of the group 16. As further discussed below, the formation command 22 of the GCS 12 can include a geographical starting position for the group 16, a geographical ending position for the group 16, one or more altitude positions for the group 16 along a flight path, the flight path itself (e.g. a series of intermediate geographical positions or WPs) for the group 16 between the starting and ending positions, separation distance(s) D between adjacent UAVs 18, as well as one or more speeds or velocities for the group 16. It is recognised that the formation command 22 can be updated while the group 16 is in flight (i.e. a current formation command 22 can represent a change to a previous formation command 22 communicated to the leader UAV 20). As is further discussed below, it is the responsibility of the leader UAV 20 to interpret and dynamically implement the formation command 22 through communication of the waypoint information 23 to each of the follower UAVs 21 of the group 16 periodically during the flight, for example based on periodically received flight status information 25 communicated from the follower UAVs 21 to the leader UAV 20 of the group 16.

One aspect, as further described below, is for the control environment 10 to provide for synchronized movement among multiple UAVs 18. This synchronization facilitates customizable, large-scale operations to expand the scope of applications, to share payload, to increase robustness and reliability, all done in a finite and synchronized period of time. In other words, preferably, movement of each of the multiple UAVs 18 within a particular group 16 is coordinated by a leader UAV 20, such that changes in formation (e.g. flight path) of the group 18 is performed by each of the individual UAVs 18 at the same time. For example, implementation of flight path changes (as dictated by the leader UAV 20) for the group 18 is begun (commence) by each of the follower UAVs 21 (in conjunction with the movements of the leader UAV 20) at the same time and are coordinated to finish (complete) at the same time. The same time can be defined as a time (e.g. commencement and/or completion time) within an accepted tolerance (e.g. time T plus or minus 1 second), such that the formation of the group 18 is perceived to begin and complete changes in flight path/formation at the "same" time and end at the "same" time. For example, the waypoint information 23 can include commencement and completion times (e.g. commencement time T=21:00 hrs+/−1 s and completion time T=21:01 hrs+/−1 s) for each of the follower UAVs 21 by which to begin and complete their changes in formation. The commencement and completion times can be dictated by the GCS 12 as relayed through the leader UAV 20. It is recognised that the timing tolerance can be explicitly included in the waypoint information 23 (as transmitted by the leader UAV 20) and/or can be programmed and stored in onboard storage 40. In this manner, synchronization of movement for each of the multiple UAVs 18 in formation can be facilitated.

In order to facilitate orderly group 16 flight dynamics amongst UAVs 18 assigned to the group 16 (i.e. a series of follower UAV(s) 21 belonging to a specified leader UAV 20), each of the UAVs 18 of the group 16 has broadcast communication ability over the network channel 15 combined with a decentralized or distributed intelligence (e.g. each of the UAVs 18 of the group 16 has onboard computing power 32 as well as operating instructions in storage 40 to enable autonomous UAV 18 operations. In terms of network channel 15 for a particular group 16 in a multiple group 16 setting (for example see FIG. 3), each Leader UAV 20 and associated follower UAVs 21 can communicate on their own "group channel" 15, such that communications between the leader UAV 20 and associated follower UAVs 21 on their own group channel 15 can be ignored by other UAVs 18 in other groups 16, thus helping to reduce communication complexity and bandwidth limitations for larger formations 17 (see FIG. 3) involving multiple groups 16 each containing multiple UAVs 18. An example of the group channel 15 is a communications frequency used only by that particular group 16 and therefore the other groups 16 in the vicinity are on different frequencies for their particular group channel 15. An alternative implementation for the group channel 15 is a particular communication protocol that is only recognised by the UAVs 18 of the associated group 16 with that particular communication protocol, such that other UAVs in other groups 16 each have their own different communication protocol (recognising that all of the different communication protocols can be communicated using the same communications frequency). It is further recognised that the communications channel 15 within a particular group 15 is different from the communications channel 14 between the leader UAV 20 (for the group 16) and the GCS 12.

In setup of the groups 18 of the super group 17 of multiple UAVs 18, the GCS 12 has a stored master list 6 (e.g. table—see FIG. 1) detailing which UAVs 18 are leader UAVs 20 and which follower UAVs 21 are assigned to each leader UAV 20 (i.e. each group 16 has a leader UAV 20 with one or more assigned follower UAVs 21). As such, the master list 6 defines for each UAV 18 of the super group 17 what specific group 16 (of the plurality of groups 16) the UAV 18 is in, and whether the UAV 18 is the leader UAV 20 or one of the follower UAV(s) 21 of that specific group 16. Also provided in the master list 6 can be the group channel 15 assigned to the specific group 16, with associated command information 22 detailing the flight path parameters of the UAVs 18 in the specific group 16 including position of the UAVs 18 of the specific group 16 within the plurality of other groups 16 in the super group 17.

As such, the GCS 12 can communicate (e.g. on channel 14) to a particular UAV 18 of the super group 17 that the particular UAV 18 is a designated leader UAV 20 and therefore provide the command information 22 for the group 16 of the designated leader UAV 20, the group channel 15, and a group list 8 (e.g. table—see FIG. 1) of designated follower UAVs 21 (e.g. with communication addresses on the group channel 15—e.g. communications network—for two way communication between the leader UAV 20 and the follower UAVs 21) for that designated leader UAV 21. The leader UAV 20 can store the group list 8 in onboard memory 40 for reference during implementation of the command information 22 with the assigned follower UAVs 21 in the group list 8. This process of designating the leader UAV 20 can be done for the other leader UAVs 20 (as well as their follower UAVs 21) of the super group 17 in order to form all of the, groups 16 (i.e. each group 16 has a leader UAV 20 with one or more assigned follower UAVs 21).

It is recognised that the GCS 12 can communicate with each of the follower UAVs 21 of the super group 17 in order to inform them of their role in the super group 17 (i.e. which group 16 they belong to). Alternatively, each of the leader UAVs 20 can contact and inform each of their follower UAVs 21 as to their status and role in the group 16 of that particular leader UAV 20. In terms of dynamic reassignment of leader/follower roles between two UAVs 18 in a particular group 16, the leader UAV 20 would provide the group list 8 to a selected follower UAV 21 of the group 16, as well as the channel 14 information, thereby providing for the follower UAV 21 to become the new leader UAV 20 of the group 16 and the old leader UAV 20 to become a new follower UAV 21 of the group 16 (meaning that assignment within the group list 8 would be updated to show changes, in the roles of the two UAVs 18 affected). Once reassigned, the new leader UAV 20 would take over coordination of the command information 22 of the group 16 with each of the follower UAVs 21 of the group 16 on group channel 15, as well as communications with the GCS 12 on the channel 14. It is recognised that either the new leader or the old leader UAV 20 would also inform the GCS 12 of the switch in roles of the two UAVs 18 of the group 16 and thus the group 16 roles for the two UAVs 18 would also be updated by the GCS 12 in the master list 6.

It is also recognised that reassignment of follower UAVs 21 from one group 16 to another group 16 within the super group 17 can also be performed, e.g. by having the leader UAV 20 of the old group 16 delete the UAV 18 from its group list 8 of follower UAVs 20 and the leader UAV 20 of the new group 16 add the UAV 18 to its group list 8 of follower UAVs 20. One or both of the leaders UAVs 20 could also inform the GCS 12 of the change in group 16 of the follower UAV 21 and thus the GCS 12 could update or otherwise confirm in the master list 6 (e.g. update the list 6 contents) that the follower UAV 21 had changed group 16 assignments.

It is recognised that the computer processor 32 and storage 40 can be referred to together as onboard controller (or onboard computers), such that the onboard controller is responsible for storing control and operation codes (e.g. formation commands 22 and WP information 23), as well as processing them. Another aspect, as further described below, is for the control environment 10 to provide UAV 18 operation safety by automatically 'repulsing' neighboring or adjacent UAVs 18 when one gets too close to others, while still stabilizing each UAV 18 within the prescribed overall group 16 flight path (as defined by the command data 22) without affecting or otherwise degrading the overall group's 16 orderly flight performance. The repulsive force between adjacent UAVs 18 is considered a virtual force (as compared to real atmospheric forces such as wind).

Referring again to FIG. 1, each of the UAVs 18 can be represented as a drone (e.g. also referred to as an unmanned aircraft system (UAS)) or aircraft without a human pilot aboard. The flight of UAVs 18 can be controlled with various kinds of autonomy: either by a given degree of remote control from an operator, located on the ground or in another vehicle, or fully autonomously, by onboard computers 32 with associated operational software for interpreting the formation command 22, the WP information 23 and/or the flight status information 25 as pertaining to whether the UAV 18 is a follower UAV 21 or a leader UAV 20. Further, the UAV cooperates with other elements in the environment 10 beyond the aircraft itself. These elements can include elements such as but not limited to the ground control station 12, data links 14, 15 and other related support equipment as desired. In general, the UAV 18 can be referred to as a powered (supported by power supply 34) aerial vehicle that does not carry a human operator, uses aerodynamic forces via the body 30 structural configuration to provide vehicle lift, can fly autonomously or be piloted remotely, can be expendable or recoverable, and can carry a payload via the body 30. It is recognised that the UAVs 18 can have multi-layered intricate systems including the physical body 30 structure, powering sources 34, flight controls of the body 32 operated via actuators 36 mounted on the body 30, telecommunication modules 38 for communicating via the communication channels 14,15, autonomous planners implemented via operating instructions stored in a storage 40, and various sensors 44 for providing real time status information 42 of UAV 18 (e.g. altitude, speed, direction, attitude, relationship to neighbouring UAVs 18 of the group 16, etc.).

For example, the body or fuselage 30 can incorporate wings, rotors, tail rotor, canopy, frame and arms for multi-rotors. The power supply 34 can be provided as batteries (e.g. lithium-polymer batteries), fuel burning motors or even solar power. The computer processing system 32 used to receive/process the data 22,23,25, as well as sensor data 42 from sensors 44, can be embodied as microcontrollers, system-on-a-chip (SOC), and single-board computers (SBC). For example, the UAV control system hardware of the computing system 32 can be referred to as Flight Controller (FC), Flight Controller Board (FCB), Autopilot, etc.

The telecommunication module 38 can be embodied as a radio frequency front-end, which connects an antenna to an analog-to-digital converter and the computing system 32. It is recognised that the telecommunication module 38 is, being airborne, wireless communication configured to provide for wireless transmission for control data 22,23 and exchange of other status data 25. Telecommunication channels 14,15 are achieved with radiofrequency electromagnetic radiations, including directed uplink toward the UAV 18 as well as downlink for emitting data signals from the UAV 18 back to the GCS 12 and/or neighbouring UAVs 18 of the group 16, thereby providing both the communication module 38 and the GCS 12 as transceivers. It is recognised that the downlink can be used to convey management status and other advanced features of the UAV 18. For example, the transmission pattern can be the control commands 22,23 issued from the transmitter (TX) 12, 38 towards the UAV 20,21 receiver (RX), and downstream transmission consisting mainly of analog video content and/or status information 25 from the UAV 18 to the GCS 12 or target UAV 18 receiver (VRX). As such, telemetry (e.g. status information 25) can be a kind of downstream link, transmitting status about the UAV 18 systems to the target receiver (e.g. GCS 12 and/or communication module 38 of neighbouring UAV (s) 18). The UAVs 18 can also use a satellite downlink to access satellite navigation information (not shown), as desired. As further discussed below, communications 14 between GCS 12 and leader UAV 20 and communications 15 between the leader UAV 20 and its follower UAVs 21 within the group 16 each respectively share the same communication protocol. However, each leader UAV 20 is equipped with two communication channels 14,15, one dedicated to GCS 12 communications 22 and one used to communicate with his/her group UAVs 21. It is recognised that the communication protocol of channel 14 and channel 15 are separate channels that can use similar or dissimilar protocols.

The sensors 44 onboard each of the UAVs 18 can be sensors such as but not limited to: 1) proprioceptive such as IMU (gyroscope, accelerometer), compass, altimeter, GPS module that can be used to report on inter UAV distance D, payload measurement; exteroceptive such as camera (CMOS, infrared), range sensors (radar, sonar, lidar) that can be used to report on inter UAV distance D; and exproprioceptive such as internal/external thermometer, gimballed camera. It is recognised that degrees of freedom (DOF) of the UAV 18 can refer to both the amount and quality of sensors 44 on-board, for example 6 DOF stands for 3-axis gyroscopes and accelerometers (a typical inertial measurement unit—IMU), 9 DOF refers to an IMU plus a compass, 10 DOF adds a barometer and 11 DOF usually combine a GPS receiver. The actuators 36 of the UAVs 18 can include: digital electronic speed controllers (which control the RPM of the motors) linked to motors/engines and propellers; servomotors; payload actuators; LEDs; speakers; etc.

The operating instructions stored in the storage 40 of the onboard controller can be embodied as computer software layered in tiers with different time requirements, the compound of layers sometimes called flight stack, or autopilot. Using the operating instructions, the UAV 18 has the ability to offer sensing, computing power and automation. The UAV 18 flight control falls under the relevancy of control theory, with its associated notions. Indeed, an UAV can make use of different automatic controls, mainly designed with loops of the operating instructions in the storage 40. For example, open-loop configurations of the operating instructions can be used to process the command data 22,23 to facilitate control of the motors (main propulsion, control surface actuators, etc.) actuated with sheer input, assuming the motors will perform as expected. Alternatively, closed-loop configurations of the operating instructions can be provided as negative feedback loops employing the sensors 44 to measure the state of the dynamical system of the UAV 18 and react accordingly as per the command data 23,25 to result in appropriate flight control of the UAV 18. This can also include PID control and other custom built control methods for position, speed and attitude regulations as dictated by the command data 22,23 in following GCS 12 flight path/plan information as well as in implementing collision avoidance processes as further described below.

The command data 22,23 can embody a number of UAV flight path execution instructions, such as but not limited to: path planning, wherein determination of an optimal flight path is performed for the UAV 18 to follow while meeting certain objectives and mission constraints (e.g. avoiding/maintaining positional relationships to neighboring obstacles including fellow UAVs 18 of the group 16, fuel requirements, etc); trajectory generation (e.g. motion planning/execution); determining flight control manoeuvres to take in order to follow a given path (as per command data 22,23) or to go from one location to another using optimized techniques and processes (as per command data 22,23). It is also recognised that the operating instructions of the storage 40 can include trajectory regulation as specific control strategies required to constrain the UAV 18 within some tolerance to a trajectory (e.g. in order to avoid a potential collision with an adjacent UAV 18 of the group 16). In addition to the collision avoidance technique, as further described below, implemented in the software to safeguard each UAV 18, we can also have one or more of the following safety features as based on the command information 22,23 parameters of the intended flight path/plan of the UAVs 18 of the group 16: 1) geofencing—to facilitate each UAV 18 flies within a given predefined flight zone, such that once the UAV 18 exceeds the defined zone, the UAV 18,21 can be commanded by the GCS 12 via the command information 22,23 to fly back or land; 2) emergency landing—any UAV 18 not performing well or short of power can be forced to land immediately as commanded by the GCS 12 via the command information 22,23. As discussed, it is recognised that the GCS 12 is in communication with the leader UAV 20 and that command information 22,23 can be updated with the leader UAV before and during implementation of the originally intended flight plan/path.

The UAVs 18 are configured into the group 16 as a single leader UAV 20 and one or more follower UAVs 21, such that the follower UAV 21 and leader UAV 20 communicate with one another via the channel 15 for implementation of the flight plan (based on the command data 22) within the group 16 formation (i.e. intra-group) and the leader UAV 20 and the GCS 12 communicate with one another using a different channel 14 in order to coordinate the flight progress of the group 16 as a whole (i.e. extra-group). To be clear, preferably coordination of the various UAVs 18 within the group 16 is facilitated via communications using the channel 15 and not using the channel 14, and coordination of the group 16 as a whole is facilitated via communications using the channel 14 and not using the channel 15. As such, each UAV 18 in a built-in mesh network (i.e. channel 15) of its assigned group 16 broadcasts its (the UAVs) status information 25 (e.g. position, direction, speed, etc.) in real-time between the follower UAVs 21 and between the follower UAVs 21 and the leader UAVs 20, while receiving other UAVs' status information 25 in motion. As such, the onboard control processing system 32 and associated operating instructions of the storage 40 can process and act on the status information 25 once received (follower 21 to follower 21, leader 20 to follower 21, and/or follower 21 to leader 20), as well as any control data 23 received from the leader 20 (i.e. leader 20 to follower 21). In terms of coordinating the flight operations of the leader 20, as mentioned, the separate channel 14 is used to communicate the command data 22 between the leader 20 and the GCS 12, as well as any flight status information 19 reporting real time flight conditions (e.g. position, speed, direction, altitude, fuel/battery power level, etc.) of the group 16 as a whole and/or for individual UAVs 18 within the group 16 assigned to the leader 20 or for the leader 20.

Path planning, design studio features: The GCS 12 can include a design toolbox to facilitate users to define and design the formation flight pattern, as sequenced through a graphical user interface. The design toolbox can automatically generate the formation control script to be sent as the leader UAV 18 as command information 22,23 to be implemented by the leader UAV 18 to direct the flight path of the leader UAV 18 and its respective follower UAVs 21.

Figure 2:
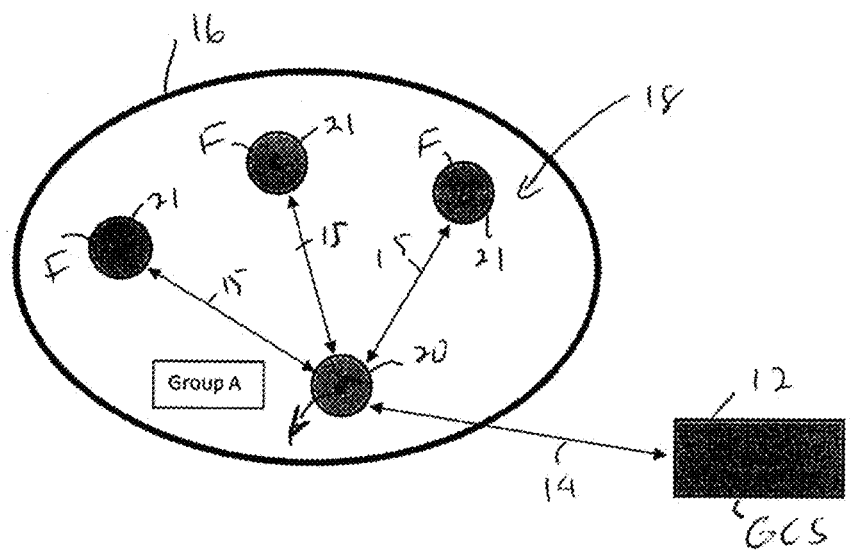
FIG. 2 shows an embodiment of UAV control of the system of FIG. 1.
Figure 3:
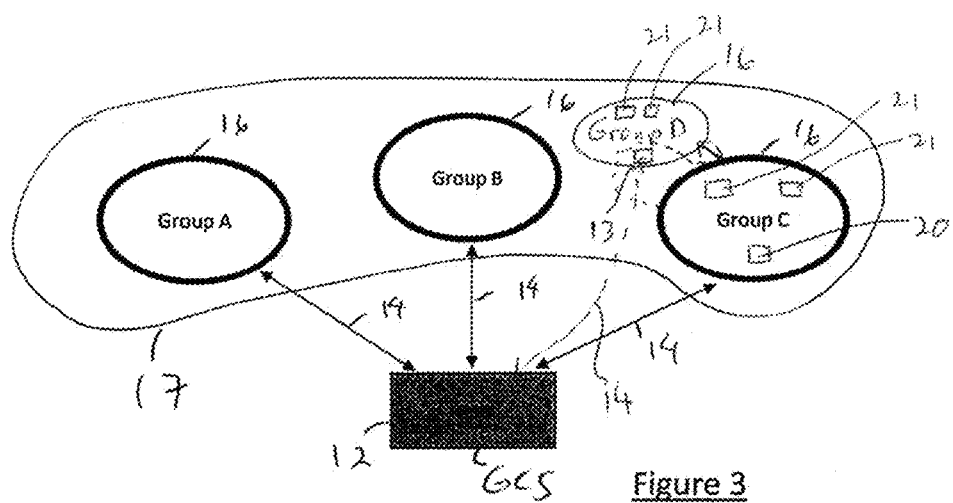
FIG. 3 shows the architecture of the system of FIG. 1.

Referring to FIGS. 2 and 3, shown is a formation configuration of the UAVs 18 containing two tiers: a group 16 and a super group 17. A group 16 of UAVs 18 can either contain all Followers F that follow a virtual leader (further described below), or many followers F and 1 real Leader L as such, the followers F will each fly at a position (and velocity) defined relative to the position (and velocity) of the leader L (e.g. real or virtual). The Leader L is responsible for the movement of each follower F within the entire group 16, coordinated via communications 23,25 on channel 15. The Leader L also communicates via channel 14 with the GCS 12 and obeys its movement commands 22, including interpreting such commands 22 and relaying them to each of the followers F within the group 16 assigned to the leader L based on status information 25 reported to the leader L from each of the followers F. In the case of a virtual leader L, one of the followers F will have the necessary communication equipment to communicate with the GCS 12 and relay its messages via the channel 14, basically acting in a dual role of both a follower F and a leader L. However it is recognised that as a leader L, the communication channel 14 is utilized and as a follower F the communication channel 15 is utilized. In the higher tier, shown in FIG. 3, the GCS 12 can control multiple Groups 16 at the same time via communicating with their respective group Leaders L via the respective communication channels 14. It is clear that the network channel 14 for GCS 12—Leader L communication is separate from Follower F—Leader L communication channel 15 of the group 16. This separation of channels 14,15 provides an advantage of minimizing unnecessary wireless communication traffic as all communications are achieved through broadcasting. As such, this network 14,15 structure provides for a single GCS 12 to control multiple UAVs 18 through a single communication link 14. As such, the integrated GCS 12 provides for integrated mission planning (via command data 22), monitoring (via status information 19) for controlling multiple UAVs 18 in similar and/or separate groups 16.

The leader UAV 20 obtains the command data 22 from the GCS 12, for example as a series of waypoints (WP) (e.g. each WP is a geographic location and altitude of the group 16), distances D between adjacent UAVs 18 (also contemplated is speed and direction V for each of the WPS as part of the command data 22) that describe a flight path of the group 16. It is recognised that the command data 22 can be received by the leader UAV 20 in order to start the flight or can be received by the leader UAV 20 midflight as a change in flight path underway, based on status information 19 of the group 16 received and acted upon by the GCS 12. The command data 22 is reflective of calculated optimal path for all UAVs 18 to move from their original positions to their respective new positions while in flight, while avoiding flight paths from crossing each other while within the group 16. Upon receipt by the leader UAV 20 of the command data 22, the leader UAV 20 then proceeds to calculate individual new positions and desired velocities at the new positions for each of the follower UAVs 21 in the group 16, based on broadcast current status information 25 (e.g. position, velocity) received from each of the follower UAVs 21 assigned to the leader UAV 20. Once calculated based on the command data 22, the leader UAV 20 sends the desired velocities at the new positions (e.g. WP information 23) to the follower UAVs 21 in order for their onboard processing system 30 and associated operating instructions in their storage 40 to interpret and coordinate operation of their respective actuators 36 to follow their own set of waypoints to their new formation positions within the flight path of the group 16.

Alternatively, the leader UAV 20 does not do calculations for the follower UAVs 21, rather the GCS 12 does all trajectory calculations and then sends (using the communication channel 15) the command information 22 for all the UAVs 20,21 to the leader UAV 20, whereby the leader UAV 20 can relay the appropriate update commands (e.g. WP information 23) to each of its follower UAVs 18 using the communication channel 15.

It is recognised that during implementation of the overall flight path, as dictated by the command data 22, the leader UAV 20 continuously receives via the channel 15 the status information 25 for each follower UAV 21, and using a Dependent Update Model compares the current position/velocity of the follower UAV 21 to the desired waypoint for the group 16 prescribed in the command data 22, then calculates the required waypoint and velocity at that waypoint of the follower UAV 21, and then transmits such the updated WP information 23 to the follower UAV 21. In this waypoint dependent update model, the leader UAV 20 calculates for itself and for the other UAVs 21 of the group 16, as all follower UAVs 21 of the group 16 receive the update waypoint data 23 and then implement their own appropriate actions if there's any discrepancy between intended position and actual position for each of the waypoints.

Alternatively, the leader UAV 20 continuously receives status information 25 for itself via the onboard sensors 44, and using an Independent Update Model compares the current position/velocity of the leader UAV 20 to the desired waypoints for the group 16 prescribed in the command data 22, then calculate any updates to the waypoint and velocity at that waypoint of the leader UAV 20. Similarly, each follower UAV 21 continuously receives status information 25 for itself via its onboard sensors 44, and using the Independent Update Model compares the current position/velocity of the follower UAV 21 to the desired waypoints for the group 16 prescribed in the command data 22, then calculates any updates to the waypoint and velocity at that waypoint of the follower UAV 21. In this waypoint independent update model, the leader UAV 20 only calculates for itself, in fact, all other follower UAVs 21 of the group 16 calculate their own appropriate actions if there's any discrepancy between intended position and actual position for each of the waypoints.

For example, it is recognised that the WP information 23 represents the next moment in time that the UAV 20,21 must arrive at a particular first position (e.g. geographic location and altitude) with a particular velocity that would facilitate orderly arrival of the UAV 20,21 at a subsequent second position, such that the first position and the second position are sequential waypoints WP defined in the command data 22. It is also recognised that the waypoints WP are implicit in time, i.e. presence at the first position is at time t1 and presence at the second position is at time t2, such that t2 is greater than t1 by a differential delta t represented in the command data 22.

Accordingly, the leader UAV 20 is constantly monitoring the current flight status information 25 for each follower UAV 21, comparing the current flight status information 25 for each follower UAV 21 against the waypoints contained in the command data 22, updating the waypoint and velocity for the follower UAV 21 based on the comparison, and then sending the updated waypoint and velocity as the WP information 23 to the follower UAV 21 for execution.

As noted above, alternatively, the follower UAV 21 does the update calculation of the waypoint information 23 by itself. During this calculation, however, each UAV 20,21 can attempt to compensate for any offsets in other UAVs' 201,21 position(s) in order to maintain the shape of the formation. In other words, in the independent model where each UAV 201,21 is responsible for their own calculations for updating their waypoint information 23, each of the UAVs 20,21 can receive then therefore constantly monitor the current flight status information 25 for each other UAV 20,21 in the group 16 and therefore take into account any discrepancies in the velocity/position of the other UAVs 20,21 in the calculations in order to attempt to compensate for any offsets in other UAVs' 20,21 position(s) in order to maintain the shape of the formation of the group 16.

It is clear from the above described content of the WP information 23 that each UAV 20,21 of the group 16 is responsible for processing the WP information 23 and then instructing their on-board actuator(s) 36 to appropriately change their current position and velocity to the new position and velocity as dictated by the WP information 23 (e.g. received from their leader UAV 20). It is in this manner that the intelligence of the group 16 is distributed or otherwise shared amongst all of the UAVs 18 of the group 16, in other words how the follower UAVs 21 determine respective changes to operation of their actuators 36 to satisfy the WP information 23 is left up to the on-board processing system 32 and associated operating instructions in their storage 40 of the follower UAVs 21. This is particularly important, since taking into account differential environmental conditions (e.g. localized wind speed, gusts, etc. experienced differently by each follower UAV 21 as reported to their on-board processing system 32 and associated operating instructions via their onboard sensors 44) is left up to the onboard intelligence of each of the follower UAVs 21, i.e. each of the follower UAVs 21 does their own intermediate position/velocity calculations based on the WP information 23 (e.g. received from their leader UAV 20).

Further referring to FIG. 3, the super group 17 can have a subgroup D, such that one of the follower UAVs 21 of the group C also performs as the leader UAV of all the follower UAVs 21 contained in group D (i.e. the sub group). Group C can also be referred to as a parent group of the subgroup D. This dual leader/follower UAV can be referred to as a hybrid UAV 13. In other words, the hybrid UAV 13 when acting as a follower in group C follows the directives (e.g. WP information 23) communicated to the hybrid UAV 13 by the leader UAV 20 of group C. As well, the hybrid UAV 13 can report its status information 25 to the leader UAV 20 of group C. When the hybrid UAV 13 acts as a leader in group D, the hybrid UAV 13 can send WP information 23 to its follower UAVs 21 of group D and can receive the status information 25 from each of the follower UAVs 21 of the group D. In one embodiment, the hybrid UAV 13 can receive its movement commands 22 via channel 15 with the leader UAV 20 of group C (rather than directly from the GCS 12 using the channel 14) and obey the received movement commands 22, including interpreting such commands 22 and relaying them to each of the follower UAVs 21 within the group D assigned to the leader of group D (i.e. the hybrid UAV 13). In another embodiment, the hybrid UAV 13 can receive its movement commands 22 via channel 14 directly from the GCS 12 using the channel 14 and obey the received movement commands 22, including interpreting such commands 22 and relaying them to each of the follower UAVs 21 within the group D assigned to the leader of group D (i.e. the hybrid UAV 13).

One advantage of providing leadership of the UAVs 18 in group D via the hybrid UAV 13 is that coordination of the multiple UAVs 18 within groups C and D do not have to be implemented by only one leader UAV 20. The provision of hybrid UAVs 13 inhibits potential communication bandwidth limitations for communications on channel 14 between multiple leader UAVs 20 and the GCS 12 and/or potential communication bandwidth limitations for communications on channel 15 between a particular leader UAV 20 and their multiple follower UAVs 21. A further advantage of using hybrid UAVs 13 is to inhibit communication complexities between multiple leader UAVs 20 and the GCS 12 and/or the between a particular leader UAV 20 and their multiple follower UAVs 21. For example, if the number of follower UAVs 21 for a particular leader UAV 20 for the super group 17 is deemed to exceed some communication threshold (e.g. communication complexity and/or bandwidth imitation), then one of the follower UAVs 21 in a particular group 16 can be designated as a hybrid UAV 13 and thus assume responsibility of a subgroup of follower UAVs 21.

Further, for example, if the number of leader UAVs 20 for a particular GCS 12 for the super group 17 is deemed to exceed some communication threshold (e.g. communication complexity and/or bandwidth imitation), then one of the follower UAVs 21 in a particular group 16 can be designated as a hybrid UAV 13 and thus assume responsibility of a subgroup of follower UAVs 21 (thereby facilitating communication between the hybrid UAV 13 and the GCS 12 indirectly via a leader UAV 20 of one of the other groups 16 designated as a patent group of the subgroup containing the hybrid leader UAV 13). It is recognised that the commands 22 received (directly from the GCS 12 on channel 14) by the leader UAV 20 of the parent group 16 (of the subgroup 16) can have included therein a designation of commands 22 (e.g. subgroup commands 22) associated with the hybrid leader UAV 13, and therefore rather than acting on designated subcommands 22 the leader UAV 20 can instead communicate the subcommands 22 on group channel 15 (of the parent group 16) for implementation by the hybrid UAV 13 on the group channel 15 of the subgroup 16).

Referring to FIG. 3, provided is a hierarchical command structure between the GCS 12, their leader UAV(s) 20 and their hybrid UAV(s) 13, such that the GCS 12 communicates (e.g. on channel 14) with the leader UAVs 20 the command data 22 (including subcommand data 22), the parent leader UAV 20 communicates (e.g. on parent group channel 15) with their designated hybrid UAV(s) 13 the subcommand data 22 as well as disseminated (from the command data 22) WP information 23 (intended to coordinate the particular flight movements of the hybrid UAV(s) 13), and the hybrid UAV(s) 13 then communicates) (e.g. on subgroup channel 15) the disseminated WP information 23 (from the subcommand data 22) to their follower UAVs 21. Further, the hierarchical command structure is such that status information 25 of the follower UAVs 21 of the subgroup 16 is communicated to the hybrid UAV 13, the hybrid UAV 13 communicates its own vehicle status information 25 to the parent group leader UAV 20 (when the hybrid UAV 13 is in the role of the follower UAV of the parent group 16), and the parent leader UAV(s) can communicate its own vehicle status information 25 to the GCS 12. It is also recognised that the hybrid UAV 13 can communicate directly on channel 14 with the GCS 12, rather than via group channel 15 with the leader UAV 20 of the parent group 16.

As discussed above, the implementation of parent groups 16 and subgroups 16 via the hybrid UAV(s) 13 provides for scalability of the super group 17, depending upon the number of UAVs 18 contained within the super group 17. It is the feature that the platform can be recursive, i.e. that each follower UAV 21 in communication with the leader UAV 20 may become a leader UAV (i.e. a hybrid UAV 13) including its own follower UAVs 21. It is this recursive architecture nature of the solution in implementation of the super group 17 that can provide for scalability of the number of multiple UAVs 18 within the super group 17.

As described above, the assignment of the UAVs 18 within the groups 16 can be set up by the GCS 12 from the start (pre-flight) or can be dynamically updated (e.g. for switching of roles) midflight, as desired.

Figure 4:
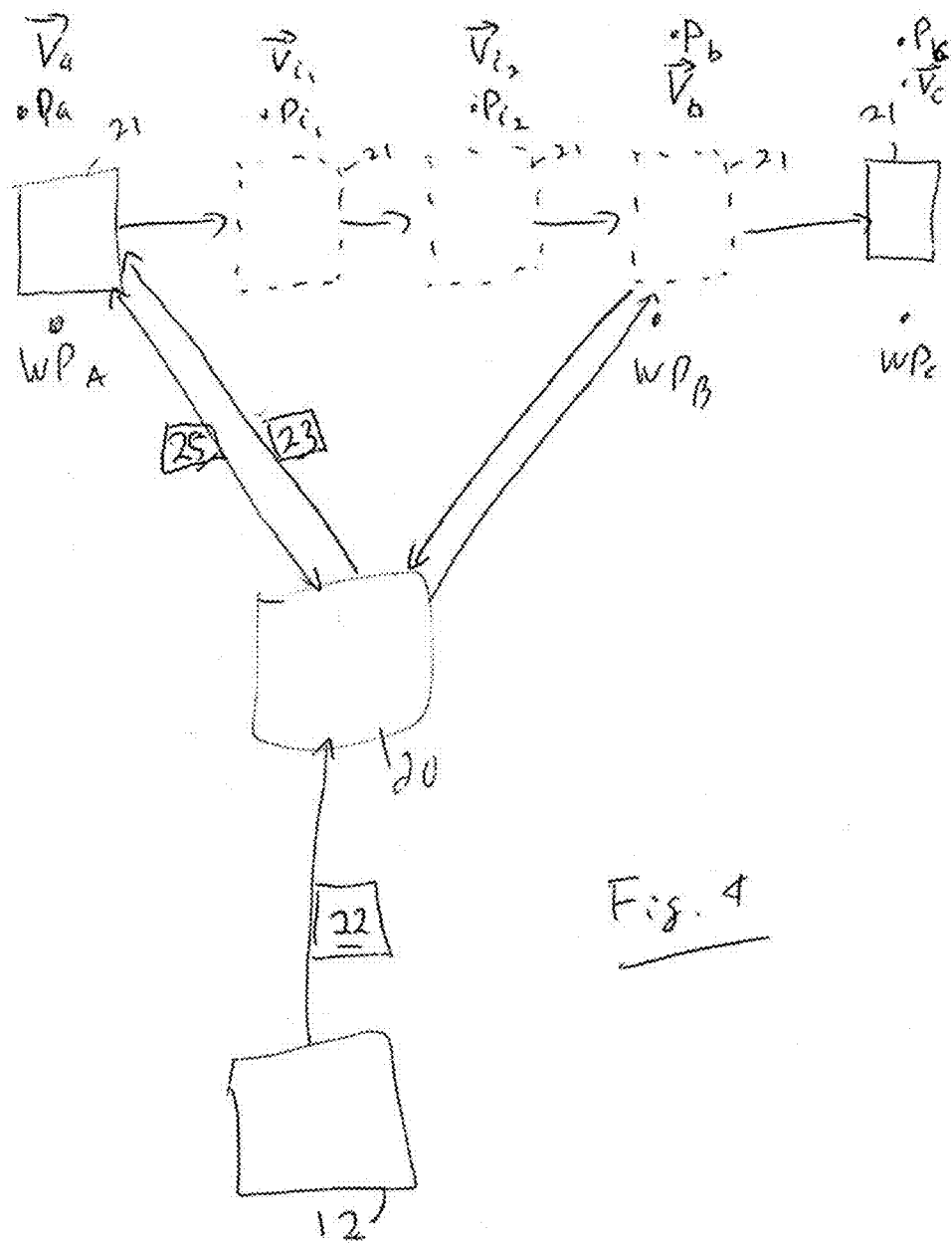
FIG. 4 shows an example determination of a dynamic flight path for the UAVs of FIG. 1.

For example, referring to FIG. 4 shown is a waypoint WP A of the command data 22 and waypoint WP B of the command data 22 as known to the leader UAV 20. When at WP A, the follower UAV 21 (obtains for itself or otherwise reports via channel 15 to the leader UAV 20) it's flight status information 25 (e.g. instant position Pa, velocity Va, etc.). The respective UAV 20,21 (e.g. follower UAV 21 in the case of the independent update model) compares the received flight status information 25, compares it against the waypoint WP B of the command data 22 and then transmits the required new position Pb and desired velocity Vb (as WP information 23) of the follower UAV 21 at waypoint WP B needed for the particular follower UAV 21 to subscribe to the overall command data 22. However, it is recognised that given the goal Pb and Vb for waypoint WP B, the UAV 20,21 is then responsible for adapting the intermediate positions Pi1,2 and velocity Vi1,2 between the waypoints WP A and WP B so as to arrive at waypoint B at the dictated goal Pb and Vb. It is recognised that intermediate Pi1,Pi2 are not dictated by the leader UAV 20, the intermediate Vi1,Vi2 are not dictated by the leader UAV 20, and the intermediate Vi1,Vi2 may be different from the Va and/or the Vb. In this manner the follower UAV 21 has autonomy over the manner in which it navigates in position and velocity between waypoint WP A and WP B, which is advantageous as any differential or unique environmental conditions (e.g. errant wind gusts, etc.) experienced by the follower UAV 21 between the waypoints WP A and WP B is not important to the leader UAV 20. Upon reaching the waypoint WP B, the follower UAV 21 could once again (e.g. periodically) report its status information 25 to the leader UAV 20 and the leader UAV 20 would again compare the status information 25 against the waypoint information as defined in the command data 22 and then calculate or recalculate the new required position Pc and desired velocity Vc (as WP information 23) for the follower to reach waypoint WP C.

For example, if upon receipt of the status information 25 from the follower UAV 21 at waypoint WP B it is determined that the goal Pb and/or Vb was not achieved by the follower UAV 21, then the leader UAV 20 would calculate the new required position Pc and desired velocity Vc accordingly. Alternatively, if upon receipt of the status information 25 from the follower UAV 21 at waypoint WP B it is determined that the goal Pb and/or Vb was achieved by the follower UAV 21, then the leader UAV 20 would calculate the new required position Pc and desired velocity Vc accordingly. Similarly, intermediate positions and velocities of the follower UAV 21 between the waypoints WP B and WP C is left up to the discretion of the follower UAV 21 in order to provide for the follower UAV 21 to autonomously adapt to local (relevant to the particular follower UAV 21) environmental conditions. As such, the described calculation and transmission of the WP information 23 to each follower UAV 21, based on the particular status information 25 of each follower UAV 21, provides for the leader UAV 20 to implicitly account for differences (i.e. non uniform) in environmental conditions experienced by different follower UAVs 21 of the group 16, as well as to adapt for over or under achievement of the required position (overshoot or undershoot in position) and velocity (too fast or too slow) at each of the waypoints WP of the command data 22, as monitored periodically by the leader UAV 20.

Figure 5:
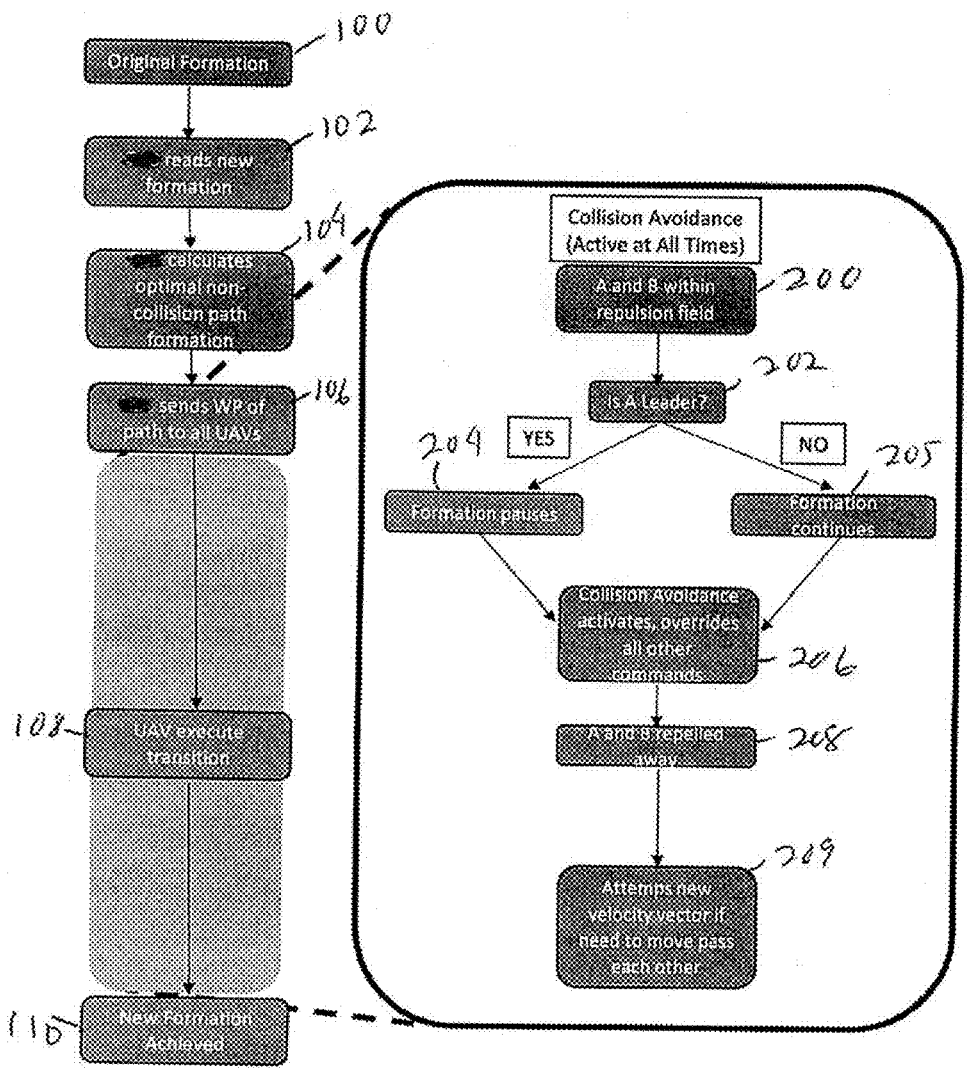
FIG. 5 is a flowchart of collision avoidance for the UAVs of FIG. 1.

Referring to FIGS. 1, 2 and 5, active control of the UAVs 20,21 can start when all UAVs 20,21 are flying in their original formation at step 100 (e.g. previously defined by the GCS 12 and implemented by all UAVs 20,21 of the group 16 via receipt by the leader UAV 20 and dissemination to the follower UAVs 21 of the group 16). At step 102, the GCS 12 reads a new formation command 22 entered from the user of the GCS 12, for example can include updated geographical position(s) for the group 16, one or more altitude positions for the group 16 along an updated flight path, the updated flight path itself (e.g. a series of updated intermediate geographical positions or WPs) for the group 16 between the starting and ending positions, updated separation distance(s) D between adjacent UAVs 18, and/or one or more updated speeds or velocities for the group 16. At step 104, the GCS 12 calculates the optimal path for all UAVs 20,21 of each group 16 to move from their original positions (previously calculated to their respective new updated position(s), while preferably avoiding flight paths of each UAV 20,21 from crossing each other. Alternatively at step 104, as mentioned above, the leader UAV 20 could be responsible for calculating new updated positions/velocities of updated waypoints of all the follower UAVs 21 of the group 16 based on updated positions/velocities of updated waypoints for the leader UAV 20 as received from the GCS 12. At step 106, once this online update calculations are completed, GCS 12 sends a series of waypoints (WP) (e.g. for leader UAV 20 or for both leader UAV 20 and follower UAVs 21) as an updated formation command 22 that describes the updated path for each UAV 20,21 using communication channel 14. At step 108, as discussed above, each of the UAVs 20,21 then proceed to follow their own set of waypoints to their new updated formation positions, as communicated to the follower UAVs 21 of the group via the leader UAV 20 of the group 16 using the communication channel 15. The chance of collision can be minimized by the GCS at the online planning stage, as is inherent in the updated formation command 22 content. Once the updated command 22 has been implemented by each of the UAVs 20,21, the new updated formation (e.g. flight path) is achieved by the UAVs 20,21 of the group 16 at step 110.

In the meantime, a Repulsion Field Collision Avoidance System is running in the background of the software for each of the processors 32 of the UAVs 20,21, providing a line of defense against aerial collision between UAVs 20,21. The repulsion force field is defined as a monitored (e.g. via sensors 44) minimum distance D threshold between any two adjacent UAVs 18. It is recognised that the monitored minimum distance D threshold can also take into account relative velocities of the adjacent UAVs 18, for example if the UAVs 18 enter into the bounds of the minimum distance D threshold while their relative velocity is divergent, then the repulsion force applied to each of the adjacent UAVs 18 can be moderated (e.g. lessened). Alternatively, if the UAVs 18 enter into the bounds of the minimum distance D threshold while their relative velocity is convergent, then the repulsion force applied to each of the adjacent UAVs 18 can be moderated (e.g. increased). Also considered is that the magnitude of moderation of the repulsive force can be dependent upon the magnitude of the convergent/divergent velocity. As such, it is recognised that as the UAVs 18 enter into the minimum distance D threshold, each of the UAVs 18 affected generates their own repulsive force for implementation by their actuators 36.

For example, each UAV 18 in the group 16 calculates its own relative position with respect to all other UAVs 18 (e.g. relative distance and bearing) using the on-board controller 32 and associated stored command instructions 22,23. The force vector (e.g. magnitude and direction) of the repulsion field between a particular pair of UAVs 18 is determined by each affected UAV 18 using the relative distance data from other UAVs 18 obtained from respective sensor 44 data). For example, if the repulsion field radius is set to 5 m, then when relative distance between a pair of UAVs 18 is farther than 5 m, the repulsive force is set to 0 and the flight path of the UAVs 18 is unaffected by the null repulsive force. On the other hand, if the relative distance is less than 5 m as sensed by the sensors 44, the repulsive force is calculated by the affected UAVs 18 (i.e. those UAVs 18 within the defined repulsion field radius) as increasing inversely to the relative distance using a predetermined function stored in the storage 40 (e.g. recognizing that this function can be modified and tuned for specific UAV 18 hardware and operating conditions—taking into account expected environmental conditions, UAV mass, maneuverability, capable speeds, dimensional extent of the UAV hardware, etc.). The angle/direction of the calculated repulsive force can be specified as the same as the bearing between the pair of UAVs, so that the repulsive force acts to push the UAVs 18 away from each other. This force vector is added/combined onto the UAV's 18 own velocity command by the onboard processing system 32, modifying the velocity of the UAV 18 so that the UAV 18 would maneuver to avoid the other UAVs 18. It is also recognised that in addition to magnitude and direction calculations for the repulsive force, altitude of the UAV 18 can also be incorporated. For example, if additional altitude correction(s) are, required for helping to avoid a detected potential collision between a pair of UAVs 18, the predetermined function can be modified to take this into account. It is also recognised that the affected UAVs 18 implementing collision avoidance steps (e.g. combining the repulsive force vector with the UAV's 18 own current velocity) can report their determined repulsive force (and/or the resultant velocity vector taking into account the determined repulsive force) to the leader UAV 20 (if not already involved in the potential collision), so as to inform the leader UAV 20 of impending deviations from the programmed flight path (as known to the leader UAV 20 its local storage 40 based on the command information 22,23 previously provided by the GCS 12). The leader UAV 20 can use the determined repulsive force calculations from the immediately affected UAVs 18 (i.e. within a defined repulsion field radius) and calculate potential other affected UAVs 18 of the group based on implementation by the affected UAVs 18 of the determined repulsive force. If the leader UAV 20 determines that other UAVs 18 of the group may become affected by the impending (or in process implementation) collision avoidance maneuvers, the leader UAV 20 can inform those other potentially affected UAVs 18 with updated position/velocity information of the UAVs 18 undergoing collision avoidance and/or can determine and then instruct the other potentially affected UAVs 18 with updated position/velocity information for processing by their onboard processing system 32. In other words the leader UAV 20 can provide course correction command data for the potentially affected UAVs 18 or can give notice of the affected UAVs 18 to the other potentially affected UAVs 18 of the group 16 in order for the onboard processing system 32 of the other potentially affected UAVs 18 to calculate their own course corrections.

Accordingly, if two UAVs 18 (or more) get within each other's repulsion force field during the implementation of the formation command 22 (or updated formation command 22), collision avoidance activates to generate respective repulsive forces by each of the UAVs 18 affected. It is recognised that conditions for potential collisions can occur due to external influences to the UAVs 18, for example atmospheric influences such as wind gusts, external object influences such as collision or potential collision with birds of other flying object that are not members of the group 16 (e.g. foreign UAVs).

Referring again to FIG. 5, shown are different behaviors that can be expected from collision avoidance during formation flight, when at step 200 the sensors 44 of a UAV 18 detects that another UAV 18 is within the minimum distance D threshold (i.e. indicating a potential collision). For example, if a UAV 18 is the leader UAV 20 of the formation of follower UAVs 21, at step 202, then the entire formation of UAVs 21 (other than those follower UAVs 21 within the minimum distance D threshold with the leader UAV 20) would pause at step 204 while collision avoidance at step 206 is happening between the leader UAV 20 and the potential collision affected follower UAV(s) 21. In other words, the follower UAVs 21 stay/hover (e.g. stop and maintain a constant altitude with a zero velocity, maintain a constant altitude at a constant velocity, etc.) at where they are and do not follow the leader UAV 20 while the leader UAV 20 is engaged in the collision avoidance maneuver, until the leader UAV 20 exits collision avoidance (i.e. once again regains control and is appropriately positioned outside of the defined repulsion field radius—meaning the repulsion force is calculated as 0). If step 204 is reached, then the leader UAV 20 would send out a pause command (e.g. status information 23) to each of the follower UAVs 21 of the group 16 using the communication channel 15 to cause the follower UAVs 21 unaffected by the detected potential collision to go into the pause state.

One example of pausing state at step 204 implemented by each of the unaffected follower UAVs 21 is where the unaffected follower UAVs 21 continue in flight in a static state, e.g. constant velocity (and optionally altitude) while the affected UAVs 20,21 calculate and implement their collision avoidance. Preferably the static state is at a zero velocity and constant altitude. As such, the unaffected follower UAVs 21 wait at step 204 until the leader UAV 20 returns to a stabilized state (e.g. is returned outside of any minimum distance D threshold(s)) before continuing on with the formation commands 22 (e.g. at step 108). Once stabilized, the leader UAV 20 would send out a resume command (e.g. status information 23) to each of the follower UAVs 21 of the group 16 using the communication channel 15 to cause the follower UAVs 21 unaffected by the detected potential collision to go into a resume formation state (i.e. to continue to implement their formation commands 22 for the designated flight path).

Returning to implementation of the formation commands 22, as received by each of the follower UAVs 21 from the leader UAV 20 prior to implementation of the collision avoidance by the affected UAVs 20,21, can include (see FIG. 4) if upon receipt of the onboard sensor information 42 by the follower UAV(s) 21 at waypoint WP B it is determined that the goal Pb and/or Vb was not achieved by the follower UAV 21, then the follower UAV 21 could calculate the new required position Pc and desired velocity Vc accordingly. Alternatively, if upon receipt of the sensor information 42 by the follower UAV 21 at waypoint WP B it is determined that the goal Pb and/or Vb was achieved by the follower UAV 21, then the follower UAV 21 would calculate the new required position Pc and desired velocity Vc accordingly using the formation command 22 content stored in the local memory of the follower UAV 21.

Referring again to FIG. 5, if at step 202 the affected UAV(s) 18 do not include the leader UAV 20, then at step 205 the execution of the formation commands 22 are implemented by the leader UAV 20 and the unaffected follower UAVs 21 while the collision affected follower UAVs 21 implement the collision avoidance at step 206 to return to a non-collision state at step 208. For example, if the affected UAVs 18 need to re-compute their velocity vectors to move past one another, then the onboard processors 32 of the affected UAVs 18 do so and implement same via their respective actuators 36.

Once the collision avoidance at step 206 is completed, i.e. the affected UAVs 18 are returned outside of any minimum distance D threshold(s) as determined by the onboard processors 32 via respective sensor information 42 and optional status information 25 collected from other UAVs 18 of the group 16, the UAVs 18 of the group 16 continue on with steps 108 and 110. Accordingly, if the affected UAV(s) 18 are only follower UAV(s) 21, the rest of the formation of UAVs 20,21 will continue to implement the formation commands 22 via the processors 32, sensors 44 and actuators 36.

A further embodiment is where the follower UAV 21 doing collision avoidance would be seen as a UAV 18 that's being disturbed, while the rest of the formation (including the leader UAV 20) can attempt to maintain formation by moving with it due to a motion synchronization algorithm used in the formation controller 32 of each of the non-affected UAVs 18 (e.g. those UAVs 18 not within any minimum distance D threshold(s) with adjacent UAVs 18) of the group 16. This would be implemented during the step 205.

In terms of addressing how the motion synchronization can work for the rest of the group 16 while collision avoidance is happening between a pair of follower UAVs 21, any UAV 18 in a collision avoidance state (i.e. within the defined repulsive field radius) can be seen as a special case to motion synchronization. Accordingly, the states of the affected UAVs 18 are not used by motion synchronization and the formation of the group 16 may not change due to their disturbances during implementation of the repulsive force as determined based on the predefined function.

It is recognised that a disadvantage to the group 16 if the formation did not "pause" while the leader UAV 20 is implementing the collision avoidance, in a leader-follower structure, the follower UAV's 21 job is to maintain a relative position to the leader UAV 20. The follower UAVs 21 themselves may not know the absolute position that they individually need to be in/at. The leader UAV 20 can be in charge of moving the entire group 16. Therefore a leader UAV 20 in a collision avoidance state cannot continue to lead the group 16 and the followers could therefore enter the pause state. Accordingly, it is recognised that there can be an operational difference to collision avoidance behaviour by the group 16, depending upon whether the leader UAV 20 or follower UAV 21 are involved in the execution of collision avoidance.

As discussed above, as collision avoidance activates between affected UAVs 18, other navigational commands are overridden (e.g. comparison with actual waypoint position verses defined waypoints contained in the formation command 22 content—also referred to as a predefined flight plan as determined by the GCS 12 and/or leader UAV 20). The two UAVs 18 are repelled away from each other, i.e. returned to outside of any minimum distance D threshold(s) as sensed by their respective sensors 44) and the formation continues of the group 16. If the detected potential collision by the UAVs 18 is a heads on collision and the affected UAVs 18 still require to move towards each other, an offset can be determined by the collision avoidance algorithm implemented by the respective processors 32 of the affected UAVs 18 is added in the velocity vector so that a new collision scenario can be avoided. For example, in the case of a heads on collision, as detected by measuring relative velocity to each other, the force vector's bearing would have an avoidance degree amount (e.g. 90 degrees) added to the force vector's bearing. This avoidance degree amount can provide to the force vector an extra avoidance (e.g. perpendicular) component so that the two UAVs 18 can move to the side of each other as opposed to purely moving backwards with respect to one another.

We claim:

1. A method for implementation of a formation flight path coordination for a group of Unmanned Ariel Vehicles (UAVs) including a leader UAV and a plurality of follower UAVs in communication with the leader UAV, the method comprising the steps of:
    receiving formation commands for the UAVs of the group from a ground controller station (GCS), the formation commands including positional and velocity information for implementation by onboard processing systems, the formation commands received on a first communication channel established between the leader UAV and the GCS;
    sending information from the formation commands by the leader UAV to the plurality of follower UAVs belonging to the leader UAV using a second communication channel established between the plurality of follower UAVs and the leader UAV, the second communication channel separate from the first communication channel;
    receiving updated formation commands for the flight path from the GCS on the first communication channel; and
    sending information from the updated formation commands by the leader UAV to the plurality of follower UAVs using the second communication channel.

2. The method of claim 1, wherein the formation commands can include information selected from the group consisting of: geographical starting point; geographical ending point; one or more altitude positions for the group along the flight path; the flight path itself as a series of intermediate geographical positions or waypoints; separation distance between adjacent UAVs of the group; and one or more speeds or velocities with associated waypoints.

3. The method of claim 1, wherein the leader UAV is either a physical UAV or a virtual UAV.

4. The method of claim 1, wherein the leader UAV for said group is in communication with another leader UAV of a second group having a second plurality of follower UAVs.

5. The method of claim 4, wherein the GCS is in communication with the another leader UAV for the purposes of moderating flight parameters of the second plurality of follower UAVs.

6. The method of claim 5, wherein the another leader UAV is a hybrid leader acting as both a follower of the leader UAV and as a leader of the second plurality of follower UAVs providing a hierarchical command structure between the GCS, the leader UAV and the hybrid UAV, such that the second plurality of follower UAVs only follows the hybrid UAV and not the leader UAV.

7. The method of claim 1, wherein said information from the formation commands is subsequently used by each of the plurality of follower UAVs to calculate using respective onboard processing systems one or more velocities with associated waypoints in order to implement the flight path originated from the GCS.

8. The method of claim 1 further comprising receiving status information from sensors of each of the plurality of follower UAVs, updating the formation commands based on the status information, and sending updated information from the updated formation commands to the plurality of follower UAVs belonging to the leader UAV.

9. The method of claim 1 further comprising receiving status information from sensors of the Leader UAV, updating the formation commands based on the status information, and sending updated information from the updated formation commands to the plurality of follower UAVs belonging to the leader UAV.

10. A ground control station (GCS) for implementation of a flight path for a group of Unmanned Arial Vehicles (UAVs) including a leader UAV and a plurality of follower UAVs in communication with the leader UAV, the GCS comprising:
   a design interface for generating formation control script for use in sending to the leader UAV as a set of formation commands including positional and velocity information for implementation by onboard processing systems, the formation commands for receipt on a first communication channel established between the leader UAV and the GCS; and
   a processor and memory for implementing stored instructions of:
   sending the formation commands to the leader UAV for subsequent use by the plurality of follower UAVs belonging to the leader UAV;
   generating updated formation commands for the flight path from and sending on the first communication channel;
   wherein the information from the updated formation commands are for implementation by the leader UAV with the plurality of follower UAVs using a second communication channel separate from the first communication channel.

11. The GCS of claim 10, wherein the formation commands can include information selected from the group consisting of: geographical starting point; geographical ending point; one or more altitude positions for the group along the flight path; the flight path itself as a series of intermediate geographical positions or waypoints; separation distance between adjacent UAVs of the group; and one or more speeds or velocities with associated waypoints.

12. A method for implementation of collision avoidance for a group of Unmanned Arial Vehicles (UAVs) including a leader UAV and a plurality of follower UAVs in communication with the leader UAV, the method comprising the steps of:
   receiving formation commands for the UAVs of the group from a ground controller station (GCS), the formation commands including positional and velocity information for implementation by onboard processing systems;
   sending information from the formation commands by the leader UAV to the plurality of follower UAVs belonging to the leader UAV;
   determining a relative distance between the leader UAV and an adjacent follower UAV of the plurality of follower UAVs is less than a predefined repulsion field threshold;
   calculating repulsion force vector based on the relative distance; and
   combining the repulsion force vector with a current velocity vector of the leader UAV using an onboard processing system of the leader UAV; and
   wherein the adjacent follower UAV implements a corresponding repulsion force vector with its current velocity vector using an onboard processing system of the follower UAV.

13. The method of claim 12, wherein the other of the plurality of follower UAVs are placed into a static operational state while the repulsion force vector is applied to both the leader UAV and the adjacent follower UAV.

14. The method of claim 12 further comprising the step of amending a bearing of the force vector by an avoidance degree amount when determining conditions for a head on collision between the leader UAV and the adjacent follower UAV.

15. The method of claim 13 further comprising the step of instructing the follower UAVs of a completed application of the repulsion force vector in order for the follower UAVs to end their static operational state and return to implementation of the flight path using said information.

* * * * *